United States Patent
Vondrell et al.

(10) Patent No.: US 10,538,337 B2
(45) Date of Patent: Jan. 21, 2020

(54) PROPULSION SYSTEM FOR AN AIRCRAFT

(71) Applicant: General Electric Company, Schenectady, NY (US)

(72) Inventors: Randy M. Vondrell, Cincinnati, OH (US); Anthony Austin Bouvette, Hamilton, OH (US); Robert Charles Hon, Fort Mitchell, KY (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 15/493,623

(22) Filed: Apr. 21, 2017

(65) Prior Publication Data
US 2018/0305036 A1  Oct. 25, 2018

(51) Int. Cl.
*B64D 33/08* (2006.01)
*B60L 50/16* (2019.01)
(Continued)

(52) U.S. Cl.
CPC .............. *B64D 33/08* (2013.01); *B60L 50/16* (2019.02); *B64C 21/06* (2013.01); *B64D 27/18* (2013.01); *B64D 27/24* (2013.01); *F02K 3/04* (2013.01); *H02G 5/10* (2013.01); *H02K 7/1823* (2013.01); *H02K 9/19* (2013.01); *B60L 2200/10* (2013.01); *B64D 2027/026* (2013.01)

(58) Field of Classification Search
CPC ........ B64D 33/08; B64D 27/18; B64D 27/24; B64D 2027/026; B64D 2221/00; B60L 50/16; B60L 2200/10; B64C 21/06; F02K 3/04; Y02T 50/64; H02G 5/10; H02K 7/1823; H02K 9/19

USPC ........................................................ 174/16.1
See application file for complete search history.

(56) References Cited

U.S. PATENT DOCUMENTS

| 1,928,575 A | 9/1933 | Sievert et al. |
| 1,937,054 A | 11/1933 | Cremer et al. |

(Continued)

FOREIGN PATENT DOCUMENTS

| EP | 2 581 308 A2 | 4/2013 |
| EP | 3 144 226 A1 | 3/2017 |
| WO | 2018/035206 A1 | 2/2018 |

OTHER PUBLICATIONS

Extended European Search Report and Opinion issued in connection with corresponding EP Application No. 18167813.7 dated Sep. 10, 2018.

*Primary Examiner* — Timothy J Thompson
*Assistant Examiner* — Michael F McAllister
(74) *Attorney, Agent, or Firm* — Dority & Manning, P.A.

(57) ABSTRACT

A propulsion system for an aircraft includes an electric power source, an electric propulsor assembly having an electric motor and a propulsor configured to generate thrust for the aircraft, and a power bus electrically connecting the electric power source to the electric propulsor assembly such that the electric power source powers the electric propulsor assembly. The power bus includes an electric line and a fluid cooling system, the fluid cooling system extending along at least a portion of a length of the electric line. The fluid cooling system is in thermal communication with the electric line for cooling the electric line during operation and is further in thermal communication with the electric motor of the electric propulsor assembly for cooling the electric motor of the electric propulsor assembly.

20 Claims, 7 Drawing Sheets

(51) Int. Cl.

| | |
|---|---|
| *B64C 21/06* | (2006.01) |
| *B64D 27/18* | (2006.01) |
| *B64D 27/24* | (2006.01) |
| *F02K 3/04* | (2006.01) |
| *H02G 5/10* | (2006.01) |
| *H02K 9/19* | (2006.01) |
| *H02K 7/18* | (2006.01) |
| *B64D 27/02* | (2006.01) |

(56) References Cited

U.S. PATENT DOCUMENTS

| | | |
|---|---|---|
| 4,370,023 A | 1/1983 | Lange et al. |
| 5,591,937 A | 1/1997 | Woody et al. |
| 6,399,878 B2 | 6/2002 | Kondo et al. |
| 8,242,357 B2 | 8/2012 | Motoi et al. |
| 8,280,467 B2 | 10/2012 | Yuan et al. |
| 8,772,639 B2 | 7/2014 | Bertrand et al. |
| 2014/0102781 A1 | 4/2014 | Gao et al. |
| 2015/0364232 A1 | 12/2015 | Yuan et al. |
| 2016/0355272 A1* | 12/2016 | Moxon .................. B64D 35/04 |
| 2017/0005544 A1* | 1/2017 | Pal ...................... F04D 29/5806 |

* cited by examiner

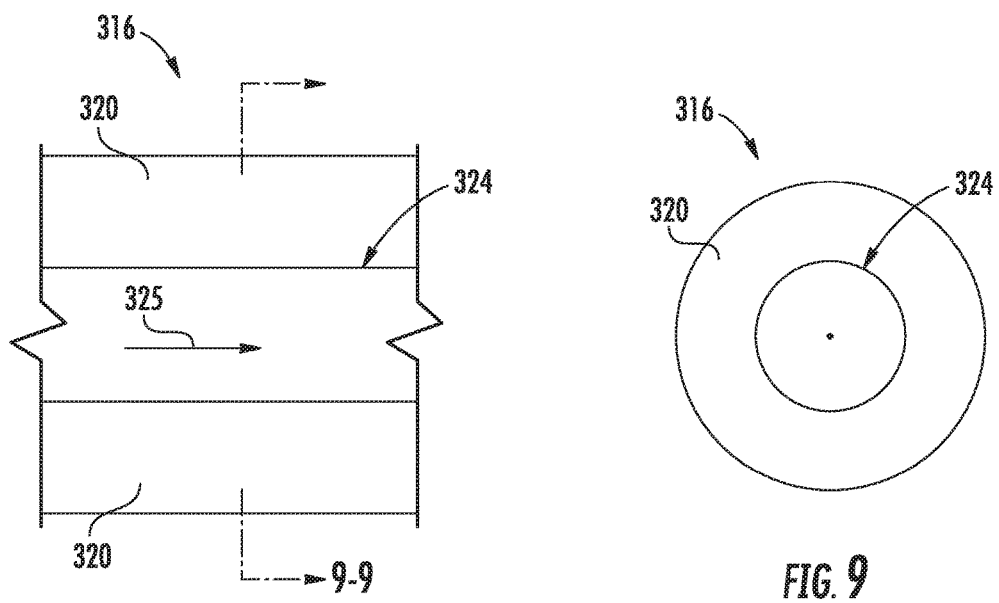
FIG. 8
FIG. 9
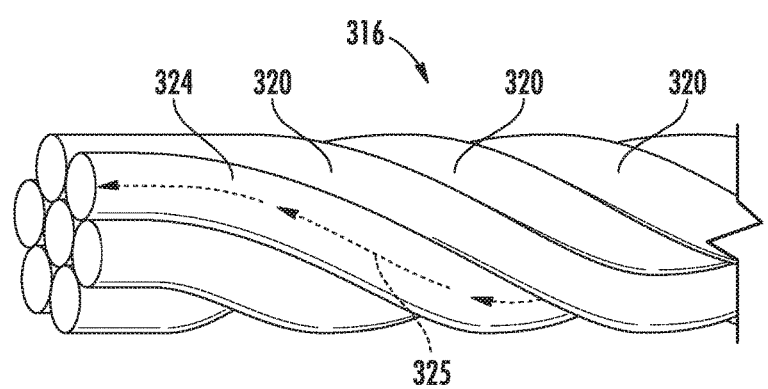
FIG. 10

PROPULSION SYSTEM FOR AN AIRCRAFT

FIELD

The present subject matter relates generally to an aircraft propulsion system, and more particularly to an aircraft propulsion system including an electric propulsion assembly and a cooled electric power bus.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

More recently, propulsion systems have been proposed of a hybrid-electric design. With these propulsion systems, an electric power source may provide electric power to an electric fan to power the electric fan. Previous systems have had problems providing a desired level of electrical power to the electric fan, especially at high altitudes, as is typical during cruise operation. Such is due at least in part to a reduction in ambient air pressure, which can make transmission of relatively high levels of electrical power difficult.

Accordingly, a propulsion system having an improved electrical power bus for providing electrical power to an electric fan would be useful. More specifically, a propulsion system having an electrical power bus capable of providing a desired amount of electrical power would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a propulsion system for an aircraft is provided. The propulsion system includes an electric power source, an electric propulsor assembly having an electric motor and a propulsor configured to generate thrust for the aircraft, and a power bus electrically connecting the electric power source to the electric propulsor assembly such that the electric power source powers the electric propulsor assembly. The power bus includes an electric line and a fluid cooling system, wherein the fluid cooling system extends along at least a portion of a length of the electric line. The fluid cooling system is in thermal communication with the electric line for cooling the electric line during operation and is further in thermal communication with the electric motor of the electric propulsor assembly for cooling the electric motor of the electric propulsor assembly.

In certain exemplary embodiments the fluid cooling system includes a fluid cooling conduit with a cooling fluid positioned therein, wherein at least a portion of the electric line extends in thermal communication with the fluid cooling conduit.

For example, in certain exemplary embodiments at least a portion of the electric line extends within the fluid cooling conduit.

For example, in certain exemplary embodiments the electric line includes a conductor, wherein the fluid cooling conduit extends within the conductor.

For example, in certain exemplary embodiments at least a portion of the electric line comprises a plurality of conductors, wherein the fluid cooling conduit is braided together with the plurality of conductors.

For example, in certain exemplary embodiments the fluid cooling system further includes a heat exchanger in fluid communication with the fluid cooling conduit.

For example, in certain exemplary embodiments the fluid cooling system further includes a first fluid transfer box and a second fluid transfer box with the fluid cooling conduit extending therebetween.

For example, in certain exemplary embodiments the electric line electrically connects the electric power source to the electric propulsor assembly, wherein the fluid cooling conduit extends along at least about fifty percent of a length of the electric line.

In certain exemplary embodiments the electric line is a first electric line, wherein the power bus further includes a second electric line, wherein the fluid cooling system includes a first fluid cooling conduit and a second fluid cooling conduit, wherein at least a portion of the first electric line extends in thermal communication with the first fluid cooling conduit, and wherein at least a portion of the second electric line extends in thermal communication with the second fluid cooling conduit. For example, in certain exemplary embodiments the first fluid cooling conduit defines a coolant flow direction towards the electric propulsor assembly, wherein the second fluid cooling conduit defines a coolant flow direction towards the electric power source.

In certain exemplary embodiments the fluid cooling system further includes a pump powered by the electric power source.

In certain exemplary embodiments the fluid cooling system is an oil cooling system utilizing an oil as a coolant.

In another exemplary embodiment of the present disclosure, an aircraft is provided. The aircraft extends between a forward end and an aft end. The aircraft includes a fuselage, an empennage at the aft end of the aircraft, a wing assembly extending from the fuselage, and a propulsion system. The propulsion system includes an electric power source including a combustion motor and a generator, the combustion motor attached to at least one of the fuselage, the empennage, or the wing assembly. The propulsion system also includes an electric propulsor assembly attached to at least one of the fuselage, the empennage, or the wing assembly and configured to generate thrust for the aircraft. The propulsion system also includes a power bus electrically connecting the electric power source to the electric propulsor assembly such that the electric power source powers the electric propulsor assembly, the power bus including an electric line and a fluid cooling system, wherein the fluid cooling system extends along a length of the electric line and in thermal communication with the electric line for cooling the electric line during operation.

In certain exemplary embodiments the wing assembly includes a first wing and a second wing, wherein the combustion engine is attached to the first wing, and wherein the electric propulsor assembly is attached to at least one of the second wing, the empennage, or the fuselage.

For example, in certain exemplary embodiments the electric propulsor assembly is attached to at least one of the empennage or the fuselage at the aft end of the aircraft.

For example, in certain exemplary embodiments the fluid cooling system includes a fluid cooling conduit with a cooling fluid positioned therein, wherein at least a portion of the electric line extends in thermal communication with the fluid cooling conduit. For example, in certain exemplary embodiments the fluid cooling conduit extends from the first wing to at least one of the second wing, the empennage, or the fuselage. For example, in certain exemplary embodiments the fluid cooling system further includes a heat exchanger in fluid communication with the fluid cooling conduit. For example, in certain exemplary embodiments the heat exchanger is positioned in thermal communication with an outside surface of the fuselage of the aircraft or an outer surface of the wing of the aircraft.

In another exemplary embodiment of the present disclosure, a propulsion system for an aircraft is provided. The propulsion system includes an electric power source, an electric propulsor assembly configured to generate thrust for the aircraft, and a power bus electrically connecting the electric power source to the electric propulsor assembly such that the electric power source powers the electric propulsor assembly. The power bus includes a first electric line and a second electric line. The power bus further includes a fluid cooling system having a first fluid cooling conduit defining a coolant flow direction towards the electric propulsor assembly and a second fluid cooling conduit defining a coolant flow direction towards the electric power source, at least a portion of the first electric line extending in thermal communication with the first fluid cooling conduit and at least a portion of the second electric line extending in thermal communication with the second fluid cooling conduit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 is a close-up, side, cross-sectional view of a section of an electric power bus of a propulsion system in accordance with another exemplary embodiment of the present disclosure.

FIG. 9 is a cross-sectional view of the section of the electric power bus of the exemplary propulsion system of FIG. 8, along Line 9-9 in FIG. 8.

FIG. 10 as a close-up, perspective view of a section of the electric power bus of a propulsion system in accordance with yet another exemplary embodiment of the present disclosure.

DETAILED DESCRIPTION

Figure 1:
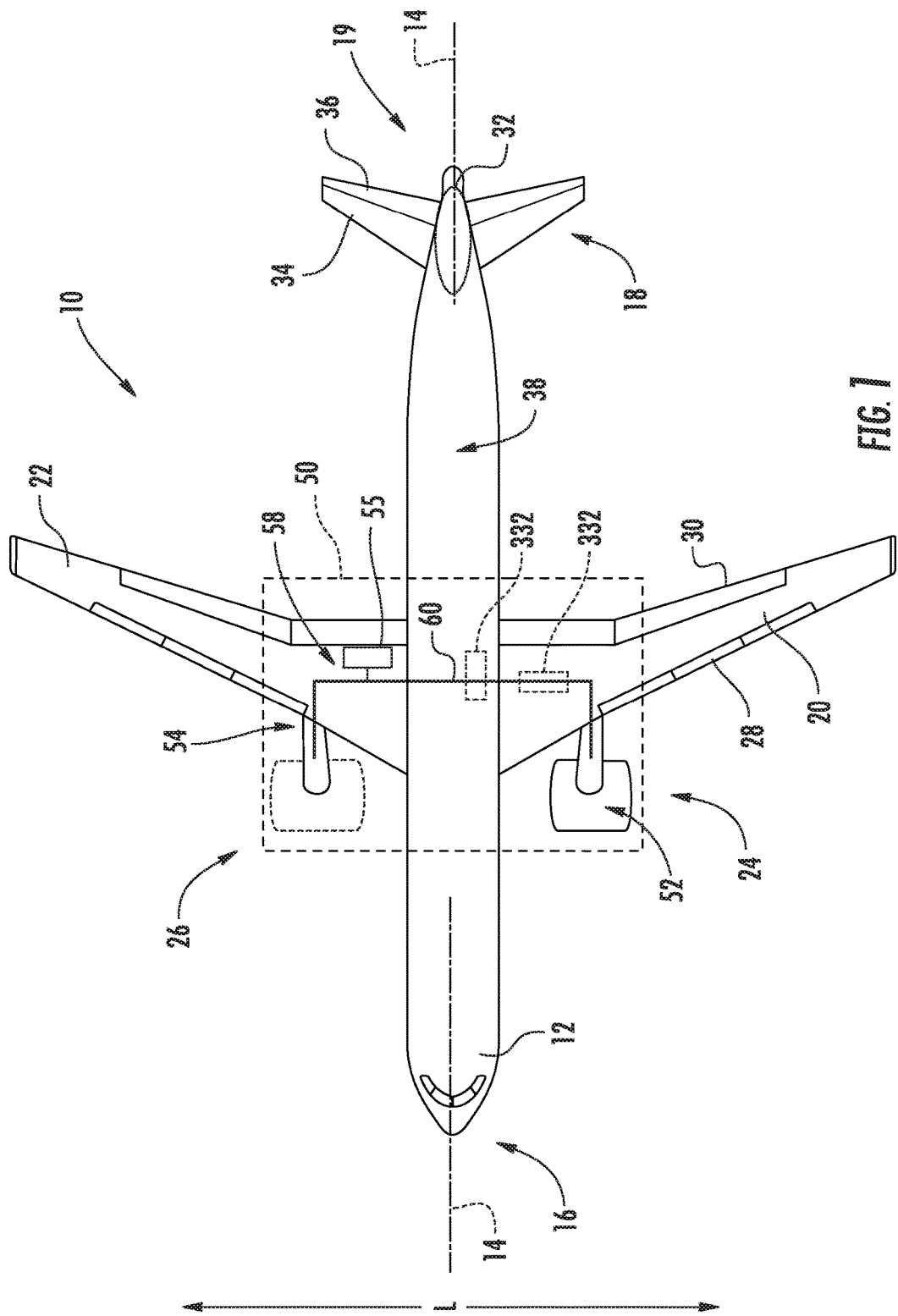
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
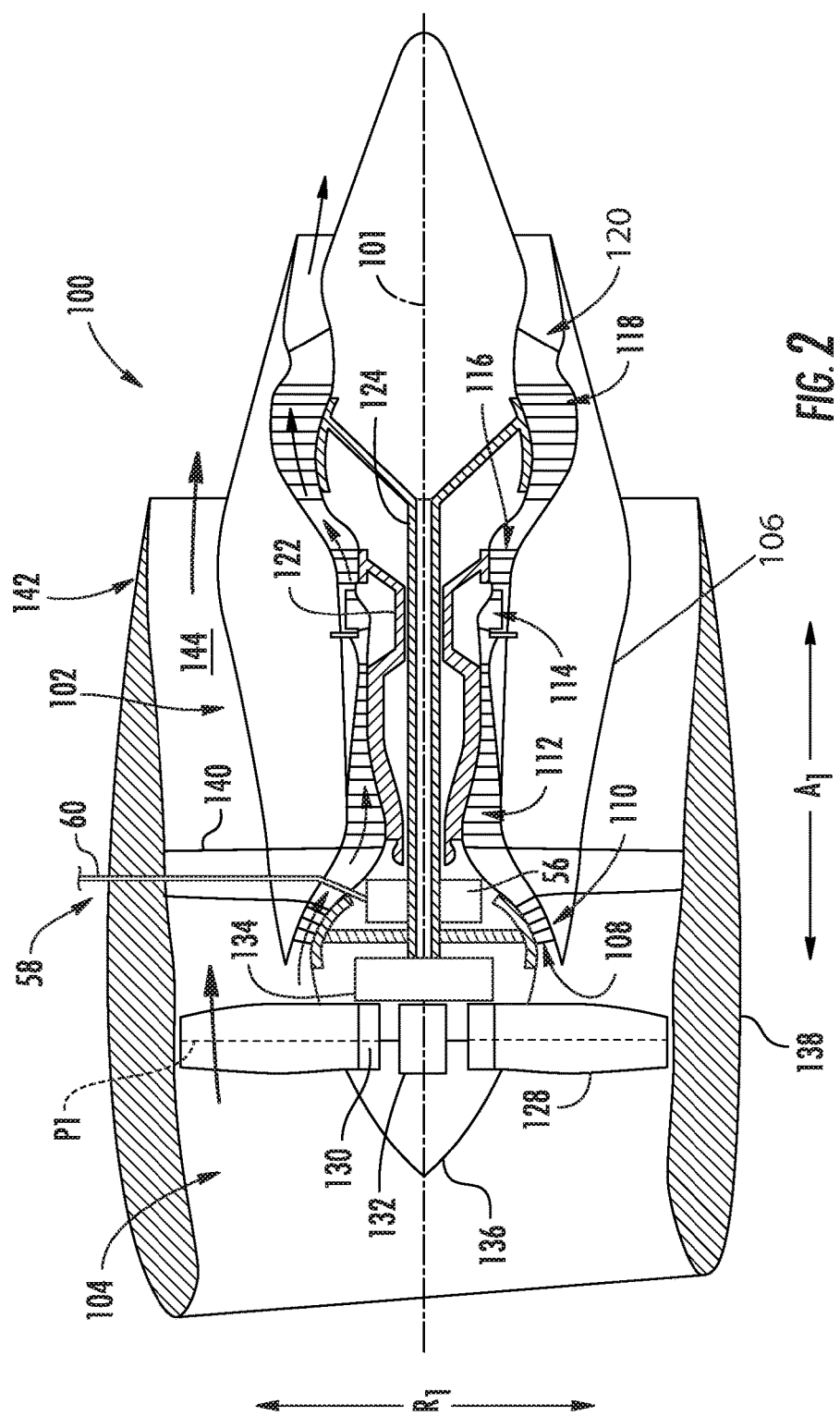
FIG. 2 is a schematic, cross-sectional view of a gas turbine engine mounted to the exemplary aircraft of FIG. 1.
Figure 3:
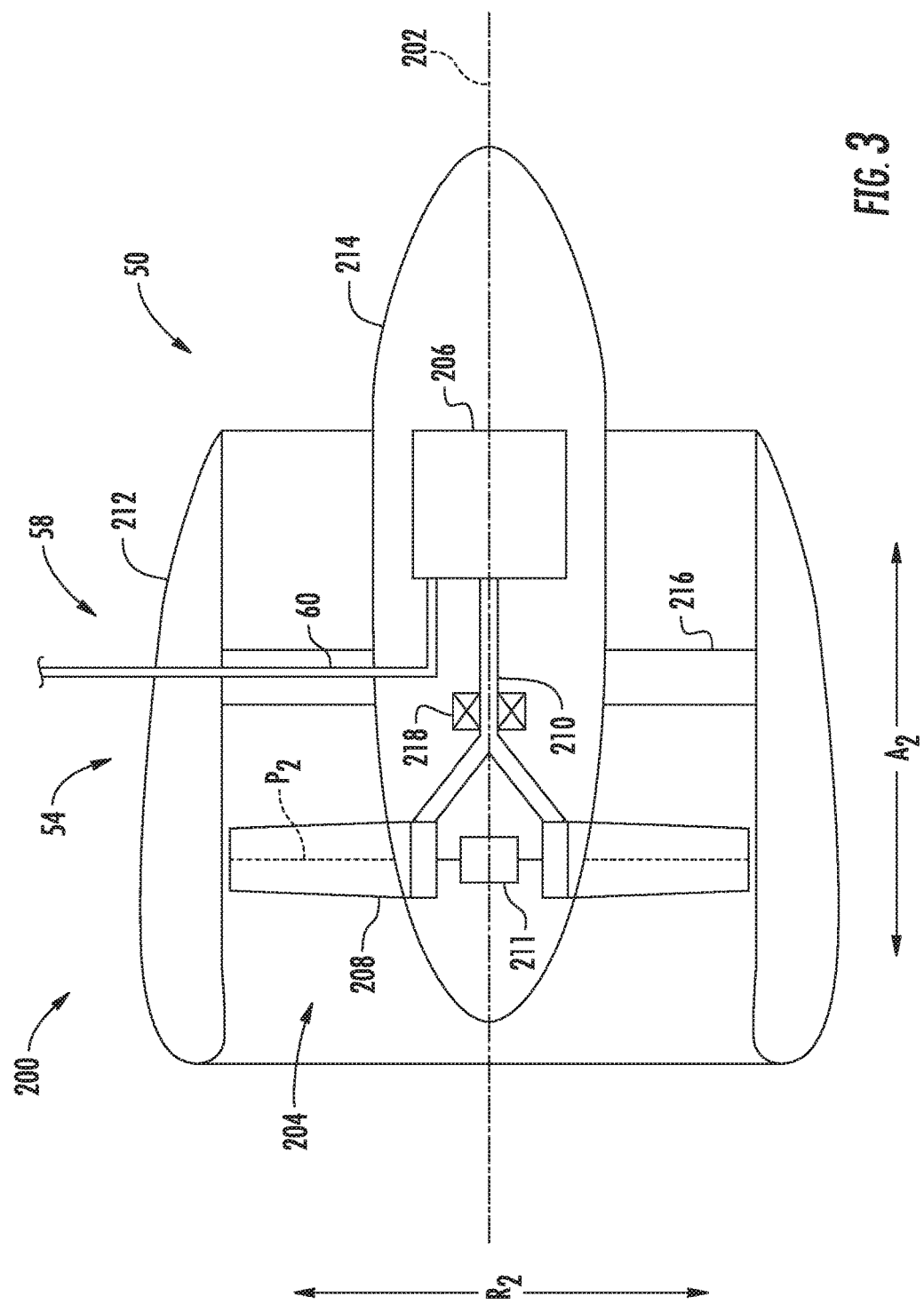
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is configured as a combustion engine and is attached to at least one of the fuselage, the empennage 19, or one of the wings of the aircraft 10. More particularly, for the embodiment of FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine 102 and a primary fan (referred to simply as "fan 104" with reference to FIG. 2). More specifically, for the embodiment depicted the first propulsor assembly 52 is configured as a turbofan engine 100 (i.e., the turbomachine 102 and the fan 104 are configured as part of the turbofan 100).

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the propulsion system 50 additionally includes an electric machine, which for the embodiment depicted is configured as an electric generator 56. The electric generator 56 and turbofan engine 100 may generally be referred to herein as an electric power source of the propulsion system 50. Additionally, the electric generator 56 is, for the embodiment depicted, positioned within the turbomachine 102 of the turbofan engine 100 and is in mechanical communication with one of the shafts of the turbofan engine 100. More specifically, for the embodiment depicted, the electric generator is driven by the second, LP turbine 118 through the LP shaft 124. The electric generator 56 is configured to convert mechanical power of the LP shaft 124 to electric power. Accordingly, the electric generator 56 is also powered by the LP system (including the LP turbine 118) of the turbomachine 102.

It should be appreciated, however, that in other exemplary embodiments, the electric generator 56 may instead be positioned at any other suitable location within the turbomachine 102 or elsewhere, and may be, e.g., powered in any other suitable manner. For example, the electric generator 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric generator 56 may instead be powered by the HP system, i.e., by the HP turbine 116 through the HP shaft 122, or by both the LP system (e.g., the LP shaft 124) and the HP system (e.g., the HP shaft 122) via a dual drive system. Additionally, or alternatively, still, in other embodiments, the electric generator 56 may include a plurality of electric generators, e.g., with one being drivingly connected to the LP system (e.g., the LP shaft 124) and one being drivingly connected to the HP system (e.g., the HP shaft 122). Further, although described as a generator, in certain embodiments, the electric generator 56 may further be configured as a "motor/generator", such that it may function as a motor when electrical power is provided thereto.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor assembly 52 may include any other suitable type of engine. For example, in other embodiments, the turbofan engine 100 may instead be configured as a turboprop engine or an unducted turbofan engine. Additionally, however, in other embodiments, the turbofan engine 100 may instead be configured as any other suitable combustion engine for driving the electric generator 56. For example, in other embodiments, the turbofan engine may be configured as a turboshaft engine, or any other suitable combustion engine.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted, the electrical power bus 58 includes one or more electrical cables or lines 60 connected to the electric generator 56, and for the embodiment depicted, extending through one or more of the outlet guide vanes 140. As will be discussed in greater detail below, the electric power bus is generally configured as a cooled electric power bus (including one or more of the heat exchangers 332 depicted in phantom; described below).

Additionally, the propulsion system 50 depicted further includes one or more energy storage devices 55 (such as one or more batteries or other electrical energy storage devices) electrically connected to the electrical power bus 58 for, e.g., providing electrical power to the second propulsor assembly 54 and/or receiving electrical power from the electric generator 56. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Referring now particularly to FIGS. 1 and 3, the exemplary propulsion system 50 additionally includes the second propulsor assembly 54 positioned, or configured to be positioned, at a location spaced apart from the first propulsor assembly 52. More specifically, for the embodiment depicted, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount in a manner such that they are spaced apart from one another, e.g., along the lateral direction L such that they ingest different airstreams along the lateral direction L.

Referring still to the exemplary embodiment of FIGS. 1 and 3, the second propulsor assembly 54 is attached to at least one of the fuselage 12, the empennage 19, or one of the wings of the aircraft 10. More particularly, the exemplary second propulsor assembly 54 depicted is mounted to the second side 26 of the aircraft 10, or rather to the second wing 22 of the aircraft 10. Referring particularly to FIG. 3, the second propulsor assembly 54 is generally configured as an electric propulsion assembly including an electric motor and a propulsor. More particularly, for the embodiment depicted, the electric propulsion assembly includes an electric fan 200, the electric fan including an electric motor 206 and a propulsor/fan 204. The electric fan 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric fan 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric fan 200 depicted additionally includes a fan casing or outer nacelle 212, attached to a core 214 of the electric fan 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric fan 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electric power source (i.e., the electric generator 56 of the first propulsor assembly 52 for the embodiment depicted) is electrically connected with the electric propulsion assembly (i.e., the electric motor 206 and the fan 204 of the electric fan 200 for the embodiment depicted) for providing electrical power to the electric propulsion assembly. More particularly, the electric motor 206 of the electric fan 200 is in electrical communication with the electric generator 56 through the electrical power bus 58, and more particularly through the one or more electrical cables or lines 60 extending therebetween. Again, as will be discussed in more detail below, the electric power bus 58 is configured as a cooled electric power bus.

A propulsion system in accordance with one or more of the above embodiments may be referred to as a gas-electric, or hybrid, propulsion system, given that a first propulsor assembly is configured as a turbofan engine mounted to a first side of an aircraft and a second propulsor assembly is configured as an electrically driven fan mounted to a second side of the aircraft.

It should be appreciated, however, that in other exemplary embodiments the exemplary propulsion system may have any other suitable configuration, and further, may be integrated into an aircraft 10 in any other suitable manner. For example, in other exemplary embodiments, the electric propulsion assembly may include any suitable number of electric fans 200. For example, in other exemplary embodiments the electric propulsion assembly may include two electric fans 200, three electric fans 200, or any other suitable number of electric fans 200. Additionally, the plurality of electric fans 200 may be arranged in any suitable manner, and attached to the aircraft 10 at any suitable location (including, e.g., tail mounted configurations).

More specifically, in still other exemplary embodiments, the electric propulsor assembly may be positioned at any other suitable location. For example, referring now to FIGS. 4 and 5, an aircraft 10 and propulsion system 50 in accordance with still another exemplary embodiment of the present disclosure is depicted. The exemplary aircraft 10 and propulsion system 50 of FIGS. 4 and 5 may be configured in substantially the same manner as exemplary aircraft 10 and propulsion system 50 of FIGS. 1 through 3, and accordingly, the same or similar numbers may refer to same or similar parts.

Figure 4:
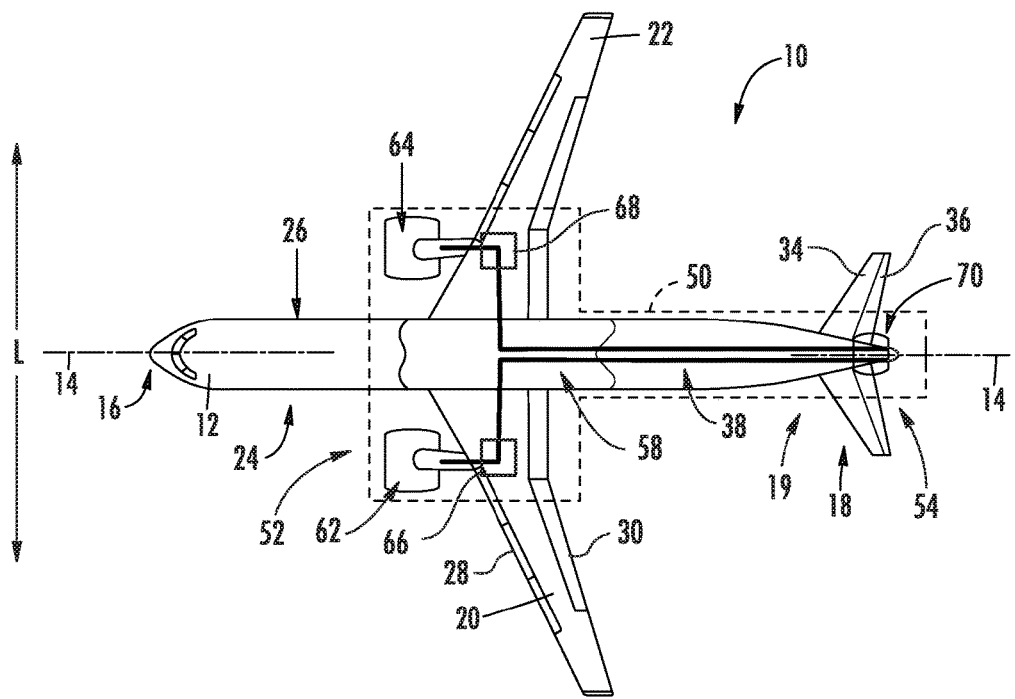
FIG. 4 is a top view of an aircraft including a propulsion system in accordance with another exemplary embodiment of the present disclosure.
Figure 5:
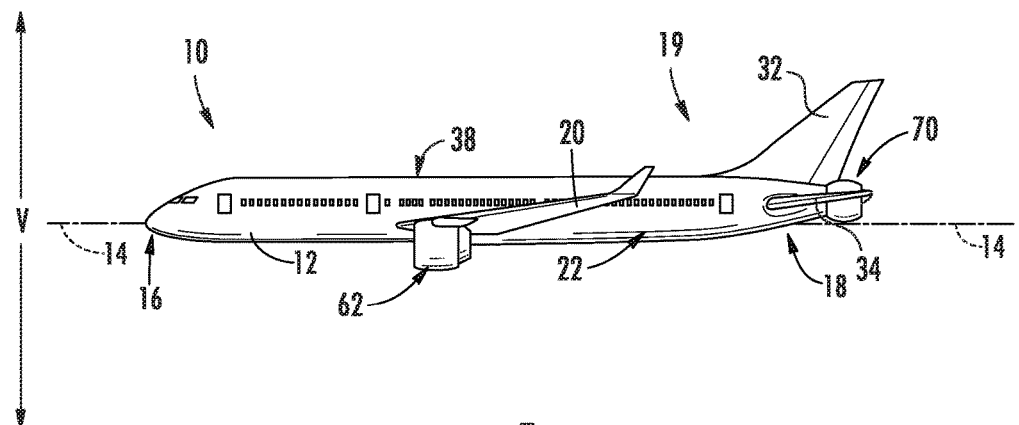
FIG. 5 is a port side view of the exemplary aircraft of FIG. 4.

For example, the exemplary aircraft 10 of FIGS. 4 and 5 generally includes a fuselage 12, an empennage 19, and a wing assembly, the wing assembly including a first, port side wing 20 and a second, starboard side wing 22. Additionally, the propulsion system 50 includes a first propulsor assembly 52 and one or more electric generators (e.g., generators 66, 68, discussed below) mechanically driven by the first propulsor assembly 52 (together configured as part of an electric power source of the propulsion system 50). Moreover, the propulsion system 50 includes a second propulsor assembly 54, which is an electric propulsor assembly. The first propulsor assembly 52 and generators are electrically connected to, and configured to provide electrical power to, the second propulsor assembly 54 via an electric power bus 58.

However, for the embodiment of FIGS. 4 and 5, the first propulsor assembly 52 includes a first aircraft engine 62 and a second aircraft engine 64. For the embodiment depicted, the first and second aircraft engines 62, 64 are each configured as gas turbine engines, or rather as turbofan engines (see, e.g., FIG. 2) attached to and suspended beneath the wings 20, 22 in an under-wing configuration. Additionally, for the embodiment of FIGS. 4 and 5, the propulsion system 50 further includes one or more electric generators operable with the engines 62, 64. More specifically, for the embodiment depicted, the propulsion system 50 further includes a first electric generator 66 operable with the first jet engine 62 and a second electric generator 68 operable with the second jet engine 64. Although depicted schematically outside the respective jet engines 62, 64, in certain embodiments, the electric generators 66, 68 may be positioned within a respective jet engine 62, 64 (see, e.g., FIG. 2). Additionally, it will be appreciated that the electric generators 56, 68 are configured to convert mechanical power of the jet engines 62, 64 to electrical power, and provide such electrical power to the electric propulsion assembly via the electric power bus 58.

Further, for the embodiment of FIGS. 4 and 5, the electric propulsion assembly includes an electric fan 70 configured to be mounted at the aft end 18 of the aircraft 10 to at least one of the empennage 19 of the aircraft 10 or the fuselage 12 of the aircraft, and hence the electric fan 70 depicted may be referred to as an "aft engine." More specifically, the exemplary electric fan 70 depicted is mounted to the fuselage 12 of the aircraft 10 at the aft end 18 of the aircraft 10 and configured to ingest and consume air forming a boundary layer over the fuselage 12 of the aircraft 10. Accordingly, the exemplary electric fan 70 depicted in FIGS. 4 and 5 may also be referred to as a boundary layer ingestion (BLI) fan. The electric fan 70 is mounted to the aircraft 10 at a location aft of the wings 20, 22 and/or the jet engines 62, 64. Specifically, for the embodiment depicted, the electric fan 70 is fixedly connected to the fuselage 12 at the aft end 18, such that the electric fan 70 is incorporated into or blended with a tail section at the aft end 18.

It should be appreciated, however, that in still other exemplary embodiments of the present disclosure, any other suitable aircraft 10 may be provided having a propulsion system 50 configured in any other suitable manner. For example, in other embodiments, the electric fan 70 may be incorporated into the fuselage of the aircraft 10, and thus configured as a "podded engine," or pod-installation engine. Further, in still other embodiments, the electric fan 70 may be incorporated into a wing of the aircraft 10, and thus may be configured as a "blended wing engine." Moreover, in other embodiments, the electric fan 70 may not be a boundary layer ingestion fan, and instead may be mounted at any suitable location on the aircraft 10 as a freestream ingestion fan.

Furthermore, in certain embodiments the first and second engines 62, 64 of the first propulsor assembly 52 may be configured as any suitable jet engine, such as turbofan engines, turboprop engines, turbojet engines, etc. Further, although the first propulsor assembly 52 includes two jet engines, in other embodiments, the first propulsor assembly 52 may have any other suitable number of jet engines, with one or more of which driving an electric generator. Further, still, in other embodiments, the propulsion system 50 may not include a first propulsion system 52 having, e.g. jet engines, and may instead have any other suitable engine(s) for rotating generator(s) and producing electrical power (i.e., may have any other suitable power source).

Figure 6:
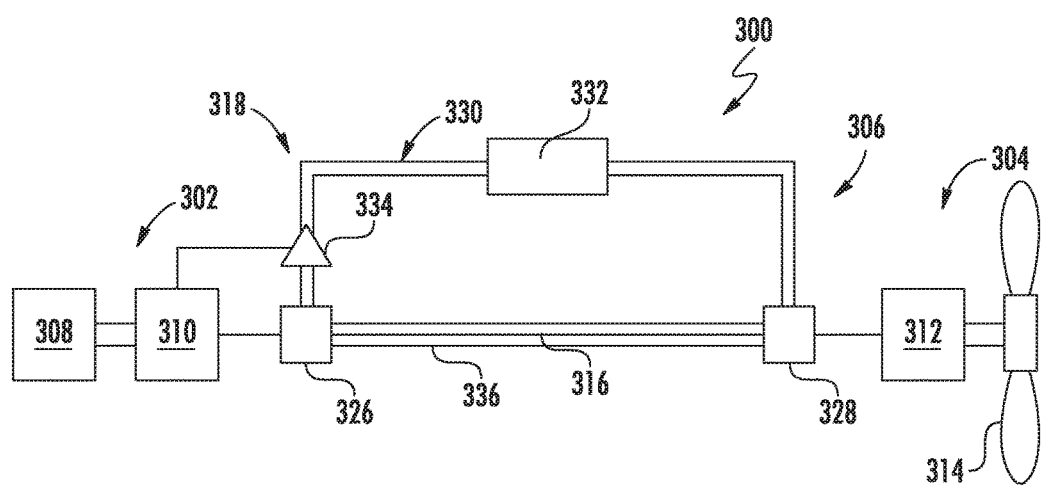
FIG. 6 is a schematic view of a propulsion system in accordance with another exemplary embodiment of the present disclosure.

Referring now to FIG. 6, a schematic view is provided of a propulsion system 300 in accordance with an exemplary embodiment of the present disclosure. The exemplary propulsion system 300 may be configured in accordance with one or more of the exemplary embodiments discussed above with reference to FIGS. 1 through 5.

For the embodiment of FIG. 6, the exemplary propulsion system 300 generally includes an electric power source 302, an electric propulsion assembly 304, and an electric power bus 306 electrically connecting the electric power source 302 to the electric propulsion assembly 304. More specifically, for the embodiment depicted, the electric power source 302 includes a combustion engine 308 and an electric generator 310. As discussed above with the embodiments of FIGS. 1 through 5, in certain embodiments the combustion engine 308 may be, e.g., one or more turbofan engines (see, e.g., FIG. 2), turboprop engines, turboshaft engines, internal combustion engines, or any other suitable engines. The electric generator 310 is mechanically coupled to the combustion engine 308, such that the combustion engine 308 drives/powers the electric generator 310. Moreover, for the embodiment depicted, the electric propulsion assembly 304 includes an electric motor 312 and a propulsor 314, with the propulsor 314 being mechanically coupled to and powered by the electric motor 312. Although the electric propulsion assembly 304 is depicted as including a single electric motor 312 and propulsor 314, in other exemplary embodiments, the electric propulsion assembly 304 may instead include a plurality of electric motors 312 and a respective plurality of propulsors 314.

Additionally, the electric power bus 300 depicted includes an electric line 316 extending between and electrically connecting the electric power source 302 to the electric propulsion assembly 304, and more specifically extending between and electrically connecting the electric generator 310 of the electric power source 302 to the electric motor 312 of the electric propulsion assembly 304. Although the electric line 316 is depicted as a single electric line, in other embodiments, the electric line 316 may instead be formed of a plurality of electric lines arranged in series and connected in any suitable manner, and/or arranged in parallel (see, e.g., FIG. 11).

Moreover, as previously discussed the electric power bus 306 is configured as a cooled power bus 306. Accordingly, for the embodiment of FIG. 6, the power bus 306 further includes a fluid cooling system 318 for cooling one or more of the electric lines of the power bus 306, such as the electric line 316.

More particularly, the fluid cooling system 318 includes at least a portion extending concentric with at least a portion one or more electric lines of the power bus 306 (such as the electric line 316). For example, referring briefly to FIG. 7 a close-up, side, cross-sectional view of a section of the exemplary power bus 306 of FIG. 6 is provided. As is depicted, the power bus 306 includes the electric line 316. The exemplary electric line 316 of FIG. 7 generally includes a conductor 320 and a sealing layer 322 for providing a watertight seal for the electric line 316. The sealing layer 322, if provided, may be grounded in certain embodiments. The conductor 320 may be a braided conductor, or a solid conductor. Further, the conductor 320 may be formed of, e.g., copper or any other suitable material. Although not depicted, the electric line 316 may further include, e.g., a grounded conductor screen enclosing the conductor 320 and an insulation layer enclosing the conductor 320 and (optionally) the conductor screen. However, in other embodiments, any other suitable configuration may be provided for the electric line 316. For example, in other exemplary embodiments, the exemplary electric line 316 may not include the sealing layer 322, and the conductor 320 (and one or more of the other elements described above) may be exposed to a coolant, as discussed below.

Figure 7:
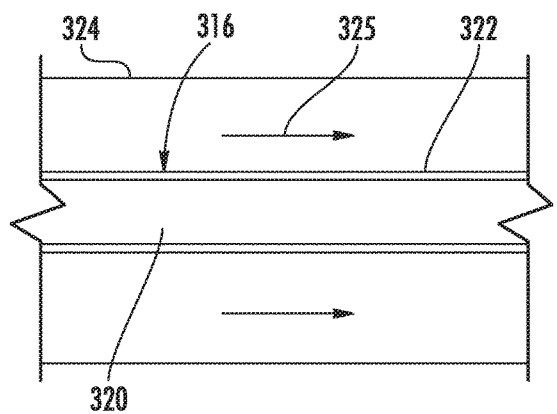
FIG. 7 is a close-up, side, cross-sectional view of a section of an electric power bus of the exemplary propulsion system of FIG. 6.

As is also depicted in FIG. 7, the cooling system 318 includes a fluid cooling conduit 324, with at least a portion of the electric line 316 extending within the fluid cooling conduit 324 of the fluid cooling system 318. The fluid cooling conduit 324 includes a cooling fluid 325 positioned therein and flowing therethrough. More specifically, for the embodiment depicted, the electric line 316 extends generally coaxially with the fluid cooling conduit 324 of the system, such that a flow of coolant 338 through the fluid cooling conduit 324 of the fluid cooling system 318 flows around the electric line 316 and may operate to, e.g., accept heat from the electric line 316 to cool the electric line 316.

Notably, inclusion of the fluid cooling system 318 in accordance with one or more of the exemplary embodiments of the present disclosure may allow for the use of materials within the power bus 306, and more specifically, within the electric line 316, that otherwise may not be capable of withstanding the temperature demands of the electric line 316. For example, inclusion of the fluid cooling system 318 may allow for an insulation layer of the transfer cable 322 to be formed of, e.g., EPR (ethylene propylene rubber), XLPE (crosslinked polyethylene), or a silicone rubber.

Referring now back to FIG. 6, it will be appreciated that the fluid cooling conduit 324 of the fluid cooling system 318 extends along at least a portion of a length of the electric line 316 and further is in thermal communication with the electric line 316 for cooling the electric line 316 during operation of the propulsion system 300. More specifically, for the embodiment depicted, the fluid cooling conduit 324 of the fluid cooling system 318 extends along at least about fifty percent of a length of the electric line 316, such as at least about seventy-five percent of a length of the electric line 316. The length of the electric line 316 may refer to an entire length of the line 316 extending between a power source (e.g., an electric generator) and a power sink (e.g., an electric motor). Accordingly, when for example, the propulsion system 300 is configured in a manner similar to the exemplary propulsion system 50 depicted in FIGS. 1 and 2, the fluid cooling conduit 324 may extend from one wing to another wing, such as from the wing 20 to the wing 22. Additionally, or alternatively, when for example, the exemplary propulsion system 300 is configured in a manner similar to the propulsion system 50 depicted in FIGS. 4 and 5, the exemplary fluid cooling conduit 324 may extend from one or both of the wings 20, 22 to one of the and empennage 19 or the aft end 18 of the aircraft 10.

Further, as is also depicted in FIG. 6, the exemplary fluid cooling system 318 of the electric power bus 306 depicted operates as a closed loop system. For example, the fluid cooling system 318 further includes a first transfer box 326 and a second transfer box 328, with the fluid cooling conduit 324 extending therebetween (and the electric line 316 extending concentrically/coaxially therewith). The first and second transfer boxes 326, 328 allow for the electric line 316 to transition into or out of a concentric relationship with the fluid cooling conduit 324. The fluid cooling system 318 further includes an outside loop 330 fluidly connecting the first transfer box 326 to the second transfer box 328. Moreover, the fluid cooling system 318 includes a heat exchanger 332 in fluid communication with the fluid cooling conduit 324, and more specifically, positioned in thermal communication with the outside loop 330 for removing heat from the coolant flowing therethrough. During operation, coolant may flow substantially continuously from the first transfer box 326, through the fluid cooling conduit 324 to the second transfer box 328, and from the second transfer box 328 through the outside loop back to the first transfer box 326 (with the heat exchanger 332 operating to remove heat therefrom).

It will be appreciated that the heat exchanger 332 may be positioned at any suitable location for cooling the coolant, such that the heat exchanger 332 may use any suitable heat sink. For example, in certain exemplary embodiments, the heat exchanger 332 may be in contact with an outside surface of a fuselage of an aircraft (shown schematically in FIG. 1) or with an outside surface of a wing of an aircraft (shown schematically in FIG. 1).

Further, still, the fluid cooling system 318 includes a pump 334 configured to generate the flow of coolant 338 through the fluid cooling system 318. The pump 334 is powered by the electric power source 302, and more particularly is depicted as being electrically powered by the electric generator 310 of the electric power source 302. However, in other exemplary embodiments, the pump 334 may be mounted to, e.g., an accessory gearbox of the combustion engine 308 (e.g., a gas turbine engine), such that the pump 334 is mechanically powered by the electric power source 302.

Furthermore, it will be appreciated that for the embodiment depicted, the fluid cooling system 318 is configured as an oil cooling system, such that the coolant is an oil. For example, the fluid cooling system may use the same lubrication oil as a lubrication oil system of the combustion engine of the electric power source. Alternatively, however, the fluid cooling system may use any other suitable oil. Moreover, given the positioning of the conduit within the fluid cooling conduit 324, the oil within the fluid cooling system may be configured to act as an electrical insulator. Accordingly, the oil may have desirable dielectric properties, in addition to desired thermal transfer properties. For example, in certain exemplary embodiments, the oil may have an electrical conductivity between about one hundred (100) picoSiemens per meter (pS/m) and 2,000 pS/m and a thermal conductivity between about 0.09 BTU/(hr.)(ft.)(° F.) and 0.05 BTU/(hr.)(ft.)(° F.). Suitable examples of such an oil include 2380 turbine oil, such as the 2380 Turbine Oil manufactured by BP, p.l.c.

It should be appreciated, however, that in other exemplary embodiments, wherein the fluid cooling system 318 is not an oil-based cooling system, the cooling system 318 may utilize any other suitable cooling fluid as the coolant. Additionally, in other exemplary embodiments, the propulsion system 300 and cooling system 318 may have any other suitable configuration. For example, in other exemplary embodiments the electric line 316 may be in thermal communication with the fluid cooling conduit 324, along a length of the cooling fluid line 316 and the cooling fluid conduit 324 (similar to FIG. 7), in any other suitable manner. For example, referring now to FIG. 8, a close-up, cross-sectional view is provided of an electric line 316 and fluid cooling conduit 324 in accordance with another exemplary embodiment. For the embodiment of FIG. 8 the cooling system 318 similarly includes a fluid cooling conduit 324 with a cooling fluid 325 flowing therethrough. However, for the embodiment depicted, the cooling fluid conduit 324 is defined within an interior of a conductor 320 of the electric line 316. For example, referring now also to FIG. 9, a cross-sectional view is provided of the exemplary cooling fluid line 316 and fluid cooling conduit 324 of FIG. 8, along Line 9-9 in FIG. 8. As is depicted, the cooling fluid conduit 324 may not be a separate structure from the conductor 320 of the electric line 316, and instead may be a hollow, interior section of the conductor 320 through which the cooling fluid 325 may flow to reduce a temperature of the conductor 320.

Additionally, in still other embodiments, the electric line 316 and fluid cooling conduit 324 of the exemplary cooling system 318 may have any other suitable configuration. For example, referring to FIG. 10, an electric line 316 and fluid cooling conduit 324 in accordance with still another exemplary embodiment of the present disclosure is depicted. For the embodiment depicted, the electric line 316 includes a plurality of conductors 320 braided together with a fluid cooling conduit 324, with the fluid cooling conduit 324 providing for a flow of cooling fluid 325 therethrough. For the embodiment depicted a diameter of the fluid cooling conduit 324 substantially the same as a diameter of the plurality of conductors 320 of the electric line 316. However, in other exemplary embodiments, the cooling fluid conduit 324 may define a larger diameter than the plurality of conductors 320, or alternatively, may define a smaller diameter in the plurality of conductors 320.

Moreover, in still other exemplary embodiments, the propulsion system 300 and electric power bus 306 may have still any other suitable configuration. For example, referring now to FIG. 11, a propulsion system 300 and an electric power bus 306 in accordance with another exemplary embodiment of the present disclosure is provided. The propulsion system 300 and electric power bus 306 may generally be configured in substantially the same manner as exemplary propulsion system 300 and electric power bus 306 described above with reference to FIG. 6. For example, the propulsion system 300 includes an electric power source 302 (having a combustion engine 308 and electric generator 310), as well as an electric propulsor assembly 304 (having an electric motor 312 and a propulsor 314).

The propulsion system 300 further includes the electric power bus 306. The electric power bus 306 electrically connects the electric power source 302 to the electric propulsor assembly 304 and includes an electric line 316 and a fluid cooling system 318. The fluid cooling system 318 extends along at least a portion of a length of the electric line 316 and is in thermal communication with the electric line 316 for cooling the electric line 316. However, for the embodiment depicted, the electric power bus 306 further includes a plurality of electric lines 316 extending between, and electrically connecting, the electric power source 302 in the electric propulsor assembly 304. Such may be, e.g., for redundancy or for transmitting alternating current (AC) electric power.

More specifically, for the embodiment depicted, the electric line 316 is a first electric line 316A and the fluid cooling system 318 includes a first fluid cooling conduit 324A, with at least a portion of the first electric line 316A extending within the first fluid cooling conduit 324A. Additionally, the fluid cooling system 318 additionally includes a second electric line 316B and a second fluid cooling conduit 324B with at least a portion of the second electric line 316B extending within the second fluid cooling conduit 324B. Further, the fluid cooling system 318, similar to the embodiment of FIG. 6, includes a first fluid transfer box 326 and a second fluid transfer box 328, with the first fluid cooling conduit 324A extending therebetween. Additionally, however, the embodiment of FIG. 11 further includes a third fluid transfer box 335 and a fourth fluid transfer box 336, with the second fluid cooling conduit 324B extending therebetween. As with the exemplary embodiment of FIG. 7, the first and second fluid cooling conduits 324A, 324B may each extend between, e.g., one or more of the wings of the aircraft (e.g., wings 20, 22 of the aircraft 10), and/or between one or more of the wings and an empennage of the aircraft or the fuselage at the aft end of the aircraft (e.g., between wings 20, 22 of the aircraft 10 or empennage 19 of the aircraft or fuselage 12 at the aft end 18 of the aircraft 10). Notably, although the exemplary fluid cooling conduits 324A, 324B are depicted configured in a similar manner as the fluid cooling conduit 324 of FIGS. 6 and 7, in other exemplary embodiments, one or both of the exemplary fluid cooling conduits 324A, 324B may be configured in a manner similar to one of the exemplary fluid cooling conduits 324 of FIGS. 8 through 10.

Moreover, for the embodiment depicted, the first fluid transfer box 326 is fluidly connected with the third fluid transfer box 335 through a fluid connection line 338, and similarly the second fluid transfer box 328 is fluidly connected to the fourth fluid transfer box 336 through a fluid connection line 340. Such a configuration allows for coolant to flow between the first and third fluid transfer boxes 326, 335 and the second and fourth fluid transfer boxes 328, 336, such that the fluid cooling system 318 may operate in a closed, continuous loop. Accordingly, it will be appreciated that the first fluid cooling conduit 324A defines a first coolant flow direction 342 and the second fluid cooling conduit 324B defines a second coolant flow direction 344, the second coolant flow direction 344 being opposite the first coolant flow direction 342. For the embodiment depicted, the first coolant flow direction 342 is towards the electric propulsor assembly 304 and the second coolant flow direction 344 is towards the electric power source 302.

Figure 11:
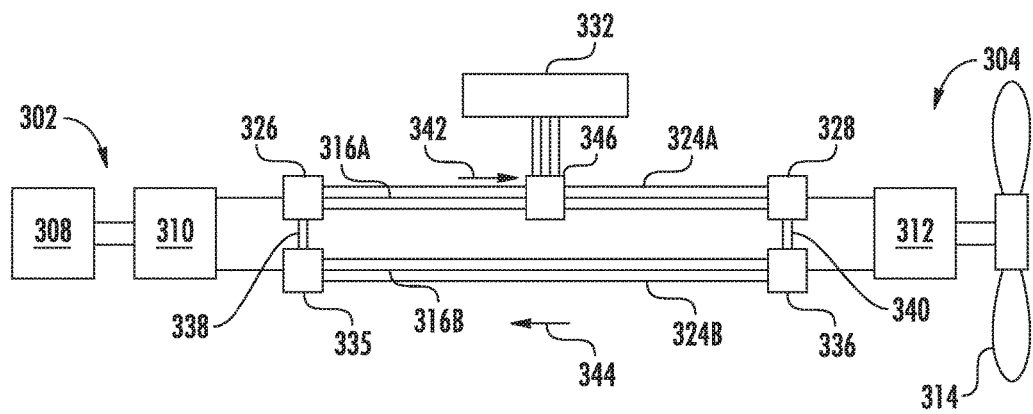
FIG. 11 is a schematic view of a propulsion system in accordance with yet another exemplary embodiment of the present disclosure.

Furthermore, for the embodiment of FIG. 11, the fluid cooling system 318 includes a heat exchanger 332 in fluid communication with the first fluid cooling conduit 324A. More specifically, for the embodiment of FIG. 11, the fluid cooling system 318 includes an intermediate fluid transfer box 346 configured to divert cooling fluid away from the first electric line 316A to and from the heat exchanger 332 at a location downstream of the first fluid transfer box 326 and upstream of the second fluid transfer box 328. Such a configuration may allow for the heat exchanger 332 to be positioned at any suitable location within the aircraft. For example, such a configuration may allow for the heat exchanger 332 to be positioned at a remote location, away from the electric power source 302 and/or the electric propulsor assembly 304.

It should be appreciated, however, that in other exemplary embodiments, the fluid cooling system 318 instead have any other suitable heat exchanger 332 configuration. For example, in other embodiments, the fluid cooling system 318 may not include the intermediate fluid transfer box 346, and instead may include a separate, closed loop cooling system in thermal communication with the first fluid cooling conduit 324A between the first and second fluid transfer boxes 326, 328, and/or in thermal communication with the second fluid cooling conduit 324B between the third and fourth fluid transfer boxes 335, 336. Such a configuration may also allow for positioning of the heat exchanger 332 a remote location within the aircraft.

Figure 12:
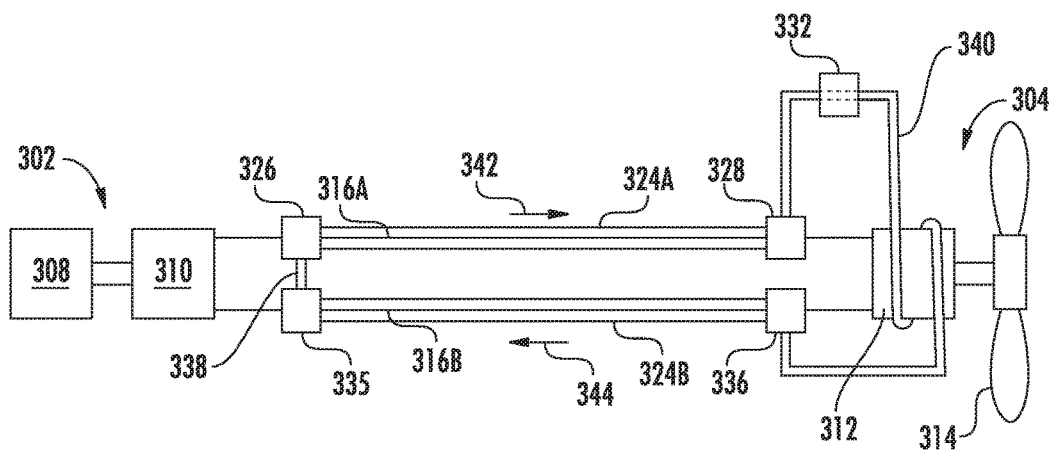
FIG. 12 is a schematic view of a propulsion system in accordance with still another exemplary embodiment of the present disclosure.

Additionally, in other exemplary embodiments, the propulsion system 300 and electric power bus 306 may further be configured in any other suitable manner. For example, referring now to FIG. 12, a propulsion system 300 including a power bus 306 in accordance with yet another exemplary embodiment of the present disclosure is provided. The exemplary propulsion system 300 and power bus 306 of FIG. 12 may be configured in substantially the same manner as exemplary propulsion system 300 and power bus 306 of FIG. 11. For example, the exemplary propulsion system 300 includes an electric power source 302 and an electric propulsor assembly 304, with a power bus 306 electrically connecting the electric power source 302 to the electric propulsor assembly 304. Additionally, for the embodiment of FIG. 12, the electric power bus 306 includes a fluid cooling system 318 having a first fluid cooling conduit 324A extending between a first fluid transfer box 326 and a second fluid transfer box 328, and a second fluid cooling conduit 324B extending between a third fluid transfer box 335 in a fourth fluid transfer box 336. Additionally, the exemplary power bus 306 includes a first electric line 316A and a second electric line 316B, each extending between and electrically connecting the electric power source 302 to the electric propulsor assembly 304. Moreover, the first electric line 316A extends within the first fluid cooling conduit 324A and the second electric line 316B extends within the second fluid cooling conduit 324B.

Further, still, for the embodiment depicted the first fluid transfer box 326 is fluidly connected to the third fluid transfer box 335 through a fluid connection line 338, and the second fluid transfer box 328 is fluidly connected to the fourth fluid transfer box 336 through a fluid connection line 340. However, for the embodiment of FIG. 12, the fluid cooling system 318 is further in thermal communication the electric motor 312 of the electric propulsor assembly 304 for cooling the electric motor 312 of the electric propulsor assembly 304. More specifically, for the embodiment of FIG. 12, the fluid connection conduit 340 of the fluid cooling system 318 extends from the second fluid transfer box 328, around the electric motor 312 of the electric propulsor assembly 304, and to the fourth fluid transfer box 336. Additionally, for the embodiment of FIG. 12, the fluid cooling system 318 includes a heat exchanger 332 thermally connected to the fluid connection conduit 340. Although the fluid connection conduit 340 is depicted as a single, continuous conduit, in other embodiments, the fluid connection conduit 340 may be formed of a plurality of separate cooling fluid conduits. Additionally, or alternatively, the fluid cooling conduit 340 may be in thermal communication with the electric motor 312 of the electric propulsor assembly 304 in any other suitable manner (e.g., through a separate closed loop system thermally connected through oil-oil heat exchanger).

Moreover, it should be appreciated, that in still other exemplary embodiments, any other suitable electric power bus 306 may be provided. For example, in other embodiments, the electric power bus 306 may additionally or alternatively include heat exchanger 332 in between the first and third fluid transfer boxes 326, 335 (i.e., in thermal communication with the fluid connection line 338). Additionally, although not depicted, in certain embodiments the fluid cooling systems 318 of FIGS. 11 and 12 may further include a pump, similar to the exemplary pump 334 of FIG. 6.

Inclusion of a power bus having a cooling system in accordance with one or more exemplary embodiments of the present disclosure may allow for maintaining a temperature of the power bus within a desired operating temperature range. For example, maintaining a temperature of the power bus, and more specifically, of the one or more electric lines of the power bus 306 within a desired operating temperature range may reduce resistance losses in the electric lines to provide a more efficient propulsion system 300 and may enable electricity at higher power levels to be transmitted. Further, such a fluid cooling system may be capable of delivering cooling fluid to a remote heat source, such as an electric motor of the electric propulsor assembly (e.g., FIG. 12). Further, still, in certain exemplary embodiments, the fluid cooling system may additionally function as an insulator for the one or more electric lines given certain dielectric properties of the cooling fluid utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft, the propulsion system comprising:
   an electric power source;
   an electric propulsor assembly comprising an electric motor and a propulsor configured to generate thrust for the aircraft; and
   a power bus electrically connecting the electric power source to the electric propulsor assembly such that the electric power source powers the electric propulsor assembly, the power bus comprising an electric line and a fluid cooling system, wherein the fluid cooling system extends along at least a portion of a length of the electric line, the fluid cooling system in thermal communication with the electric line for cooling the electric line during operation and further in thermal communication with the electric motor of the electric propulsor assembly for cooling the electric motor of the electric propulsor assembly.

2. The propulsion system of claim 1, wherein the fluid cooling system includes a fluid cooling conduit with a cooling fluid positioned therein, wherein at least a portion of the electric line extends in thermal communication with the fluid cooling conduit.

3. The propulsion system of claim 2, wherein at least a portion of the electric line extends within the fluid cooling conduit.

4. The propulsion system of claim 2, wherein the electric line comprises a conductor, and wherein the fluid cooling conduit extends within the conductor.

5. The propulsion system of claim 2, wherein at least a portion of the electric line comprises a plurality of conductors, and wherein the fluid cooling conduit is braided together with the plurality of conductors.

6. The propulsion system of claim 2, wherein the fluid cooling system further comprises a heat exchanger in fluid communication with the fluid cooling conduit.

7. The propulsion system of claim 2, wherein the fluid cooling system further comprises a first fluid transfer box and a second fluid transfer box with the fluid cooling conduit extending therebetween.

8. The propulsion system of claim 2, wherein the electric line electrically connects the electric power source to the electric propulsor assembly, and wherein the fluid cooling conduit extends along at least about fifty percent of a length of the electric line.

9. The propulsion system of claim 1, wherein the electric line is a first electric line, wherein the power bus further comprises a second electric line, wherein the fluid cooling system includes a first fluid cooling conduit and a second fluid cooling conduit, wherein at least a portion of the first electric line extends in thermal communication with the first fluid cooling conduit, and wherein at least a portion of the second electric line extends in thermal communication with the second fluid cooling conduit.

10. The propulsion system of claim 9, wherein the first fluid cooling conduit defines a coolant flow direction towards the electric propulsor assembly, and wherein the second fluid cooling conduit defines a coolant flow direction towards the electric power source.

11. The propulsion system of claim 1, wherein the fluid cooling system further comprises a pump powered by the electric power source.

12. The propulsion system of claim 1, wherein the fluid cooling system is an oil cooling system utilizing an oil as a coolant.

13. An aircraft extending between a forward end and an aft end comprising:
   a fuselage;
   an empennage at the aft end of the aircraft;
   a wing assembly extending from the fuselage; and
   a propulsion system comprising
      an electric power source comprising a combustion motor and a generator, the combustion motor attached to at least one of the fuselage, the empennage, or the wing assembly;
      an electric propulsor assembly attached to at least one of the fuselage, the empennage, or the wing assembly and configured to generate thrust for the aircraft; and
      a power bus electrically connecting the electric power source to the electric propulsor assembly such that the electric power source powers the electric propulsor assembly, the power bus comprising an electric line and a fluid cooling system, wherein the fluid cooling system extends along a length of the electric line and in thermal communication with the electric line for cooling the electric line during operation.

14. The aircraft of claim 13, wherein the wing assembly includes a first wing and a second wing, wherein the combustion engine is attached to the first wing, and wherein the electric propulsor assembly is attached to at least one of the second wing, the empennage, or the fuselage.

15. The aircraft of claim 14, wherein the electric propulsor assembly is attached to at least one of the empennage or the fuselage at the aft end of the aircraft.

16. The aircraft of claim 14, wherein the fluid cooling system includes a fluid cooling conduit with a cooling fluid positioned therein, wherein at least a portion of the electric line extends in thermal communication with the fluid cooling conduit.

17. The aircraft of claim 16, wherein the fluid cooling conduit extends from the first wing to at least one of the second wing, the empennage, or the fuselage.

18. The aircraft of claim 16, wherein the fluid cooling system further comprises a heat exchanger in fluid communication with the fluid cooling conduit.

19. The aircraft of claim 18, wherein the heat exchanger is positioned in thermal communication with an outside surface of the fuselage of the aircraft or an outer surface of the wing of the aircraft.

20. A propulsion system for an aircraft, the propulsion system comprising:
   an electric power source;
   an electric propulsor assembly configured to generate thrust for the aircraft; and a power bus electrically connecting the electric power source to the electric propulsor assembly such that the electric power source powers the electric propulsor assembly, the power bus comprising a first electric line and a second electric line, the power bus further comprising a fluid cooling system having a first fluid cooling conduit defining a coolant flow direction towards the electric propulsor assembly and a second fluid cooling conduit defining a coolant flow direction towards the electric power source, at least a portion of the first electric line extending in thermal communication with the first fluid cooling conduit and at least a portion of the second electric line extending in thermal communication with the second fluid cooling conduit.

* * * * *